United States Patent
Purtell, II et al.

(10) Patent No.: US 10,606,800 B1
(45) Date of Patent: *Mar. 31, 2020

(54) POLICY-BASED LAYERED FILESYSTEM MANAGEMENT

(71) Applicant: OPEN INVENTION NETWORK LLC, Durham, NC (US)

(72) Inventors: Thomas Joseph Purtell, II, Menlo Park, CA (US); John Whaley, San Mateo, CA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/799,885

(22) Filed: Oct. 31, 2017

Related U.S. Application Data

(63) Continuation of application No. 12/435,279, filed on May 4, 2009, now Pat. No. 9,805,041.

(51) Int. Cl.
*G06F 16/11* (2019.01)
(52) U.S. Cl.
CPC ................ *G06F 16/122* (2019.01)

(58) Field of Classification Search
CPC .......... G06F 21/6218; G06F 17/30082; G06F 17/30011; G06F 17/30091; G06F 11/3006; G06F 17/3089; G06F 17/30067; G06F 11/2094; G06F 2221/2141
USPC .......... 707/600–831, 899, 999.001–999.206
See application file for complete search history.

(56) References Cited

U.S. PATENT DOCUMENTS

| | | | |
|---|---|---|---|
| 7,631,155 B1 * | 12/2009 | Bono ..................... | G06F 3/0608 711/156 |
| 2006/0218150 A1 * | 9/2006 | Janakiraman .......... | G06F 16/10 |
| 2007/0094471 A1 * | 4/2007 | Shaath ................ | G06F 12/1466 711/163 |
| 2007/0156670 A1 * | 7/2007 | Lim ..................... | G06F 21/6218 |
| 2009/0030957 A1 * | 1/2009 | Manjunath .......... | G06F 16/1824 |

* cited by examiner

*Primary Examiner* — Angelica Ruiz

(57) ABSTRACT

Some embodiments provide a system that provides a filesystem in a computer system. During operation, the system obtains a policy for the filesystem and separates the filesystem into a set of layers based on the policy. Next, the system processes input/output (I/O) operations to the filesystem by directing each of the I/O operations to one of the layers based on the policy. Finally, the system periodically maintains the layers using a master image of the filesystem.

20 Claims, 6 Drawing Sheets

US 10,606,800 B1

POLICY-BASED LAYERED FILESYSTEM MANAGEMENT

RELATED APPLICATIONS

This application is a continuation of U.S. patent application Ser. No. 12/435,302, filed on 4 May 2009, now issued U.S. Pat. No. 9,805,041, issued on 31 Oct. 2017. The subject matter of this application is also related to commonly assigned application Ser. No. 12/435,273, filed on 4 May 2009, entitled "Interception and Management of I/O Operations on Portable Storage Devices," now issued U.S. Pat. No. 8,578,064, issued 5 Nov. 2013, as well as Ser. No. 12/435,302, filed on 4 May 2009, entitled "Transactional Virtual Disk with Differential Snapshots," now issued U.S. Pat. No. 8,805,788, issued 12 Aug. 2014.

BACKGROUND

Field

The present embodiments relate to techniques for managing filesystems. More specifically, the present embodiments relate to a technique for policy-based management of layered filesystems and registry subsystems.

Related Art

Virtual machines may be used to extend the functionality and portability of computing environments. For example, a virtual machine containing a guest operating system may be executed from any computer with a compatible hypervisor for the virtual machine. The self-contained nature of the virtual machine may also facilitate the efficient copying and transfer of the virtual machine between multiple devices, including personal computers, servers, and portable storage devices.

Ease of deployment and portability may further be facilitated through the central management and local execution of virtual machines. An example of a central management solution for locally executed virtual machines may include the MokaFive Server, Player and Creator products offered by MokaFive (moka5, Inc. a Delaware corporation). In particular, a virtual machine may be centrally defined and managed using the MokaFive Server. Any computer containing the MokaFive Player may then download an image of the virtual machine from the MokaFive Server and run the virtual machine within the MokaFive Player. Changes made to the virtual machine from the computer may be backed up on the MokaFive Server so that subsequent execution of the virtual machine from other computers may include the changes. Similarly, updates to the virtual machine may be administered by the MokaFive Server and automatically included in the virtual machine image so that subsequent use of the virtual machine includes the updates.

However, centrally managed virtual machines may include configurability and customizability issues. First, centrally managed virtual machines may have limited end-user configurability. For example, user-specific (e.g., user-installed) applications and/or configuration settings may not persist between invocations of a centrally administered virtual machine because each invocation downloads a virtual machine image that does not include the applications and/or configuration settings.

Furthermore, administrators of virtual machines may lack a simple mechanism for customizing virtual machines for end-users. For example, an administrator may wish to install different sets of applications on a virtual machine to fit the needs of different types of end-users. However, the administrator may be required to create a different virtual machine for each type of end-user and install applications for that end-user on the virtual machine.

Hence, what is needed is a mechanism for improving the end-user configurability and customizability of centrally managed virtual machines.

BRIEF DESCRIPTION OF THE FIGURES

In the figures, like reference numerals refer to the same figure elements.

DETAILED DESCRIPTION

Figure 1:
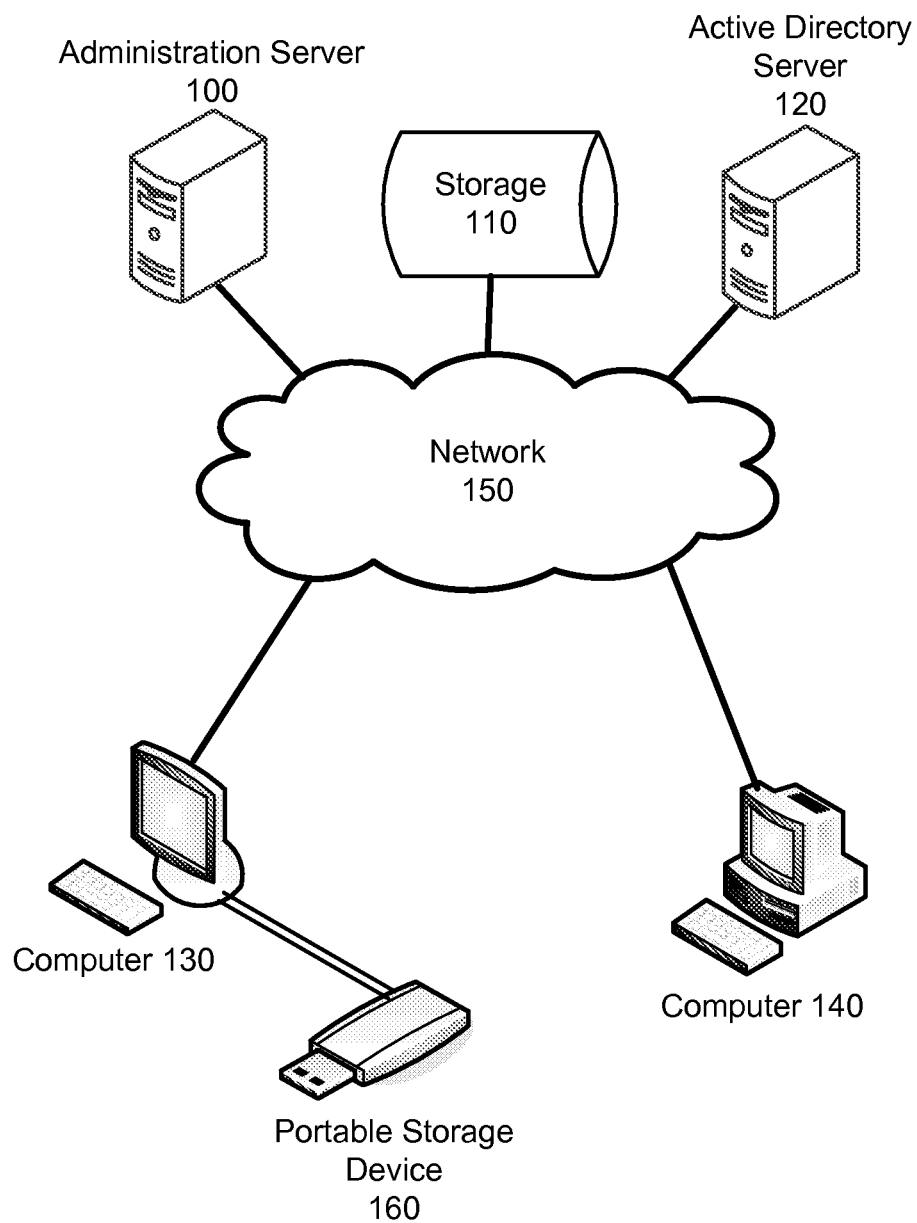
FIG. 1 shows a schematic of a system in accordance with an embodiment.

A layered filesystem may be used to combine multiple data sources into a single coherent filesystem. For example, a layered filesystem such as UnionFS may merge files and directories from multiple filesystems (e.g., branches) into a unified view of the files and directories. Precedence may also be assigned within a layered filesystem so that a data source with a higher precedence overrides a data source with a lower precedence. If a file exists in two UnionFS branches, the file in the higher-priority branch is used in the layered filesystem, and the file in the lower-priority branch is ignored. Furthermore, a layered filesystem may redirect read and write operations based on precedence and/or other criteria. For example, UnionFS may use copy-on-write semantics to store a modified file from a read-only branch in a higher-priority read-write branch.

Layered filesystems may also be helpful in the administration of virtual machines and/or other virtual computing environments. For example, an image of a virtual machine may be stored in a read-only layer of a layered filesystem, while user-specific changes to the virtual machine may be stored in a read-write layer of the layered filesystem. As a result, user-specific changes in the read-write layer may be unaffected by centrally administered changes to the virtual machine image in the read-only layer.

Policy-based management of layered filesystems may further facilitate the central administration and end-user configuration of virtual machines. In particular, a policy for a layered filesystem may separate data for a virtual machine into multiple layers. Each layer may be associated with a different set of access permissions; the virtual machine image may be stored on a read-only layer, while other data may be stored in read-write layers. The policy may also assign data to different layers based on attributes (e.g., filename, file type, path, etc.) of the data; user data such as documents may be stored in one layer, while user-installed applications (e.g., executables) may be stored in another layer. Configuration data such as registry keys and sub-keys may also be separated into layers based on keys and values. Input/output (I/O) operations to the layered filesystem may also be directed to individual layers based on the policy.

Moreover, layers may be added and removed based on the needs of individual users and/or the policy. For example, a layer containing an office suite may be added to the layered filesystem if a user of the virtual machine requires word-processing and/or spreadsheet capabilities. On the other hand, if the user has installed a virus on a layer containing user-installed applications, the layer may be removed so that the virtual machine may no longer be affected by the virus after a reboot. Finally, the layer containing the virtual machine image may be replaced with a new master image every time the virtual machine is booted to ensure that the user is executing the latest version of the virtual machine.

FIG. 1 shows a schematic of a system in accordance with an embodiment. As shown in FIG. 1, the system includes an administration server 100, storage 110, an active directory server 120, a set of computers 130-140, a network 150, and a portable storage device 160. Each of the components is described in further detail below.

Computers 130-140 may correspond to electronic computing devices that operate as computing devices for users of computers 130-140. For example, each computer 130-140 may correspond to a personal computer (PC), laptop computer, and/or workstation. Network 150 may correspond to a computer network, such as a local area network (LAN), wide area network (WAN), wireless network, intranet, internet, and/or another type of network that facilitates communication between devices (e.g., administration server 100, storage 110, active directory server 120, computers 130-140) connected to network 150. For example, computers 130-140 may operate as clients in network 150 and allow users of computers 130-140 to send and receive emails, retrieve webpages, and/or send and receive files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments respectively running Linux, Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system. In other words, the execution of one or more virtual computing environments on computers 130-140 may provide increased versatility, utilization of resources, and/or security to computers 130-140. Software such as VMware Workstation (Windows), VMware Fusion (Mac) (VMware Fusion™ is a registered trademark of VMware, Inc.), Parallels, and VirtualBox (VirtualBox™ is a registered trademark of Sun Microsystems, Inc.) may be used to provide these capabilities.

In one or more embodiments, the system of FIG. 1 enables the central management and local execution of virtual computing environments. Such central management and local execution may allow virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server, Player and Creator products offered by MokaFive (moka5, Inc. a Delaware corporation). In particular, the MokaFive Player may be used with computers 130-140 to locally execute a centrally defined and managed virtual computing environment according to rules and access controls defined in the MokaFive Server.

In one embodiment, administration server 100 is a server that supports centralized definition of virtual computing environments and management of access and permissions to the same for local execution. For example, administration server 100 may correspond to the MokaFive Server. Administration server 100 may itself execute in a virtual computing environment, (e.g. a VMware ESX environment). For example, an administrator of virtual computing environments for computers 130-140 may create, configure, and delete the virtual computing environments by interacting with administration server 100 through a management interface (e.g., graphical user interface (GUI), web-based user interface, etc.) provided by administration server 100.

In one or more embodiments, active directory server 120 provides network-based directory services. For example, active directory server 120 may correspond to a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provides access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies to virtual computing environments.

In one or more embodiments, virtual computing environments executed on computers 130-140 are stored in storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

In particular, each computer 130-140 may include one or more subscriptions to virtual computing environments. Each subscription may identify administration server 100 and a specific virtual computing environment provided by administration server 100. To execute the virtual computing environment, a user of the computer may provide authentication credentials for the virtual computing environment to administration server 100, which may relay the authentication credentials to the active directory server 120 as necessary. If the user is authorized to use the virtual computing environment, the virtual computing environment is downloaded from storage 110 over network 150 and loaded on the computer for use by the user.

Furthermore, virtual computing environments executing on computers 130-140 may be stored on and/or loaded from portable storage devices (e.g., portable storage device 160) coupled to computers 130-140, including Universal Serial Bus (USB) flash drives, flash memory cards, and/or portable computing devices (e.g., mobile phones, portable media players, etc.). Portable storage device 160 may also include virtualization software (e.g., hypervisors), subscription information, user data, and/or other information required to load the virtual computing environments into any compatible computer (e.g., x86 computers) without pre-installation of software on the computer.

In other words, the virtual computing environments and all information and software required to execute the virtual computing environments may be loaded, stored, and managed entirely from portable storage device 160 instead of from computers 130-140 and/or network 150. Management of virtual computing environments from portable storage devices is described in a co-pending non-provisional application by inventors John Whaley and Thomas Joseph Purtell II and filed on the same day as the instant application entitled "Interception and Management of I/O Operations on Portable Storage Devices," having Ser. No. 12/435,273, now U.S. Pat. No. 8,578,064, and filing date 4 May 2009, which is incorporated herein by reference.

In one or more embodiments, virtual computing environments on computers 130-140 are stored in layered filesystems. The layered filesystems may separate different components of the virtual computing environments into individually managed layers based on policies for the layered filesystems. In one or more embodiments, each layered filesystem includes a system layer that stores an image of a virtual computing environment obtained from storage 110 and/or administration server 100. The layered filesystem may also include an application layer for storing user-installed applications, as well as a user data layer for storing user-specific documents and settings.

The layered filesystems may further facilitate the management of the virtual computing environments by enabling individual layers to be added, removed, temporarily disabled, and/or restored. In particular, the system layer may be periodically populated with a new image of the virtual computing environment from storage 110 and/or administration server 100. As a result, computers 130-140 may always execute the most up-to-date versions of the virtual computing environments. Furthermore, the application layer may be removed or temporarily disabled if a virus or malfunctioning application is installed in the application layer. Snapshots or backups of individual layers may additionally enhance the security, reliability, and integrity of the virtual computing environments.

Figure 2:
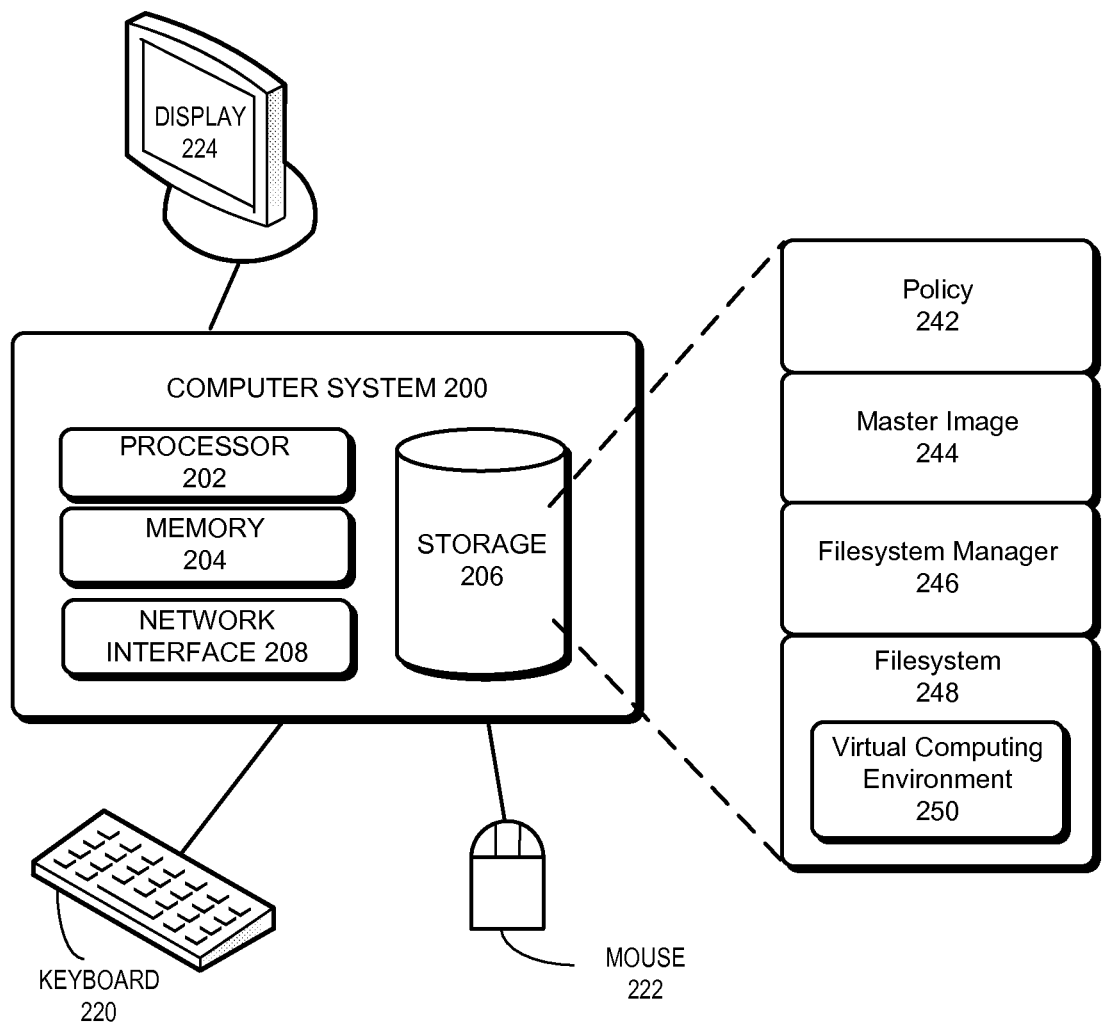
FIG. 2 shows a computer system in accordance with an embodiment.

FIG. 2 shows a computer system 200 in accordance with an embodiment. Computer system 200 may correspond to an electronic computing device (e.g., computers 130-140 of FIG. 1) that is connected to a network, such as network 150 of FIG. 1. Computer system 200 includes a processor 202, memory 204, storage 206, network interface 208, and/or other components found in electronic computing devices. Processor 202 may support parallel processing and/or multi-threaded operation with other processors in computer system 200. Computer system 200 may also include input/output (I/O) devices such as a keyboard 220, a mouse 222, and a display 224.

Computer system 200 may include functionality to execute various components of the present embodiments. Computer system 200 may include a host operating system (not shown) that coordinates the use of hardware and software resources on computer system 200, as well as one or more applications that perform specialized tasks for the user. To perform tasks for the user, applications may obtain the use of hardware resources on computer system 200 from the host operating system, as well as interact with the user through a hardware and/or software framework provided by the host operating system.

In particular, computer system 200 may provide a filesystem 248 containing a virtual computing environment 250. In particular, filesystem 248 may store files, directories, and/or settings used to execute virtual computing environment 250 in computer system 200. Alternatively, virtual computing environment 250 may be distributed across multiple filesystems that include filesystem 248. For example, virtual computing environment 250 may include a Microsoft Windows (Microsoft Windows™ is a registered trademark of Microsoft Corp.) guest operating system. Files in the Microsoft Windows guest operating system may be stored in one filesystem, while registry keys and sub-keys may be stored in another filesystem.

Virtual computing environment 250 may be obtained from network-accessible storage (e.g., storage 110 of FIG. 1) using network interface 208 according to instructions specified by an administration server (e.g., administration server 100 of FIG. 1) and stored in filesystem 248. A hypervisor (not shown) on computer system 200 may then load virtual computing environment 250 into computer system 200 for local execution of virtual computing environment 250 on computer system 200.

In one or more embodiments, the hypervisor corresponds to a hosted hypervisor (e.g., type II hypervisor) that runs within the host operating system and obtains resources for the domains through the host operating system. Alternatively, the hypervisor may function as a native hypervisor (e.g., type I hypervisor) that runs directly on hardware in computer system 200. The hypervisor may also be referred to as a virtual machine monitor. For example, the hypervisor may include the MokaFive Player.

Within computer system 200, virtual computing environment 250 may execute independently of a network connection with the administration server and/or storage, subject to any security policies defined for virtual computing environment 250 on the administration server. Alternatively, virtual computing environment 250 may require an intermittent and/or constant connection to the network as specified by a security policy on the administration server. For example, virtual computing environment 250 may continue executing on computer system 200 only if computer system 200 is capable of communicating with the administration server on a periodic basis (e.g., weekly). Such periodic communication may be required to enforce security in virtual computing environment 250 and/or to enable remote termination of virtual computing environment 250 from the administration server. A network connection may also be required for updates to virtual computing environment 250 to be received by computer system 200 from the network in accordance with a notification from the administration server.

In one or more embodiments, changes made to virtual computing environment 250 during execution are saved to filesystem 248. For example, the user may install applications on virtual computing environment 250, create or edit documents on virtual computing environment 250, and/or update configuration settings (e.g., Microsoft Windows registry keys) in virtual computing environment 250. To maintain the state of virtual computing environment 250, directories, files, and/or settings (e.g., registry keys) on filesystem 248 may be updated with the user's changes. As discussed below, the organization and management of filesystem 248 may facilitate the configuration and update of virtual computing environment 250 from the administration server while maintaining end-user configurability for the user of virtual computing environment 250.

In one or more embodiments, filesystem 248 corresponds to a layered filesystem. In other words, files, directories, and/or settings in filesystem 248 may be organized into a discrete set of layers. Furthermore, each layer in filesystem 248 may be individually managed by a filesystem manager 246 according to a policy 242 for filesystem 248.

As with virtual computing environment 250, policy 242 may be obtained from network-accessible storage associated with virtual computing environment 250, such as storage 110 of FIG. 1. Policy 242 may correspond to a file and/or other unit of data that describes the organization of layers and data within filesystem 248. For example, policy 242 may specify the number and ranking of layers in filesystem 248, as well as the separation of data for virtual computing environment 240 into the layers.

To separate virtual computing environment 240 into the layers, filesystem manager 246 may create a disk partition for each layer and assign a rank to the layer. For example, filesystem manager 246 may create five disk partitions and assign each disk partition a numerical rank from 1 to 5. On the other hand, if filesystem 248 is used to store registry data, filesystem manager 246 may create five registry hive files and assign each hive file a numerical rank from 1 to 5. Furthermore, layers of filesystem 248 may include directories in other filesystems. For example, one layer of filesystem 248 may include a directory in a host filesystem of computer system 200, while another layer of filesystem 248 may include a directory in a network filesystem.

Next, filesystem manager 246 may store data for virtual computing environment 250 in the layers based on layer assignments specified by policy 242. Each layer assignment may assign data to a specific layer of filesystem 248 based on attributes of the data, such as data type (e.g., file, registry key, file type, etc.), data value, filename, and/or path. For example, data for virtual computing environment 250 may be separated into different layers of filesystem 248 based on file extensions, directories, registry keys, registry values, and/or other attributes associated with the data.

In addition, input/output (I/O) operations to filesystem 248 may be directed to individual layers based on policy 242. A read operation may be directed to the highest-ranked layer containing the file or setting (e.g., registry key) to be read, while a write operation may be directed to a layer based on the layer assignments in policy 242. For example, a write operation may be directed to a specific layer based on a filename, file extension, path, registry key, and/or registry value associated with the write operation. Conversely, the write operation may be directed to a default layer in filesystem 248 if no layer assignment matches the write operation. The management of filesystem 248 based on policy 242 is discussed below with respect to FIGS. 3-4.

In one or more embodiments, policy 242 is used by filesystem manager 246 to maintain separation between system data and user-specific data in virtual computing environment 250. In particular, system data that is critical to the execution of virtual computing environment 250 may be stored in one layer or set of layers, while data associated with user changes to virtual computing environment 250 may be stored in another layer or set of layers. Such separation may allow updates, patches, and/or other administrative changes to virtual computing environment 250 to take effect in while preserving user identity, documents, applications, and/or other configurations within virtual computing environment 250.

To ensure that changes to virtual computing environment 250 from the administration server and/or network are propagated to computer system 200, filesystem manager 246 may periodically maintain one or more layers of filesystem 248 using a master image 244 of virtual computing environment 250 obtained from the administration server and/or network. For example, filesystem manager 246 may replace system data for virtual computing environment 250 with data from master image 244. Because the system data may be confined within one or more layers, filesystem manager 246 may simply replace the layer(s) with all or part of master image 244.

Filesystem manager 248 may also manage individual layers of filesystem 248 in a way that enhances the reliability, security, integrity, and portability of virtual computing environment 244. More specifically, filesystem manager 248 may back up and/or restore individual layers, add or remove layers, remove specific files from layers, and/or temporarily disable layers. Such enhancements are discussed below with respect to FIG. 3.

Filesystem manager 248 may also be used to manage data not associated with virtual computing environment 250. For example, filesystem manager 248 may provide policy-based management of data for native operating systems and applications on computer system 200. As another example, filesystem manager 248 may be used to organize data on computer system 200 across multiple local and remote storage devices by creating a different layer for each storage device and writing data to each layer according to layer assignments in policy 242.

Figure 3:
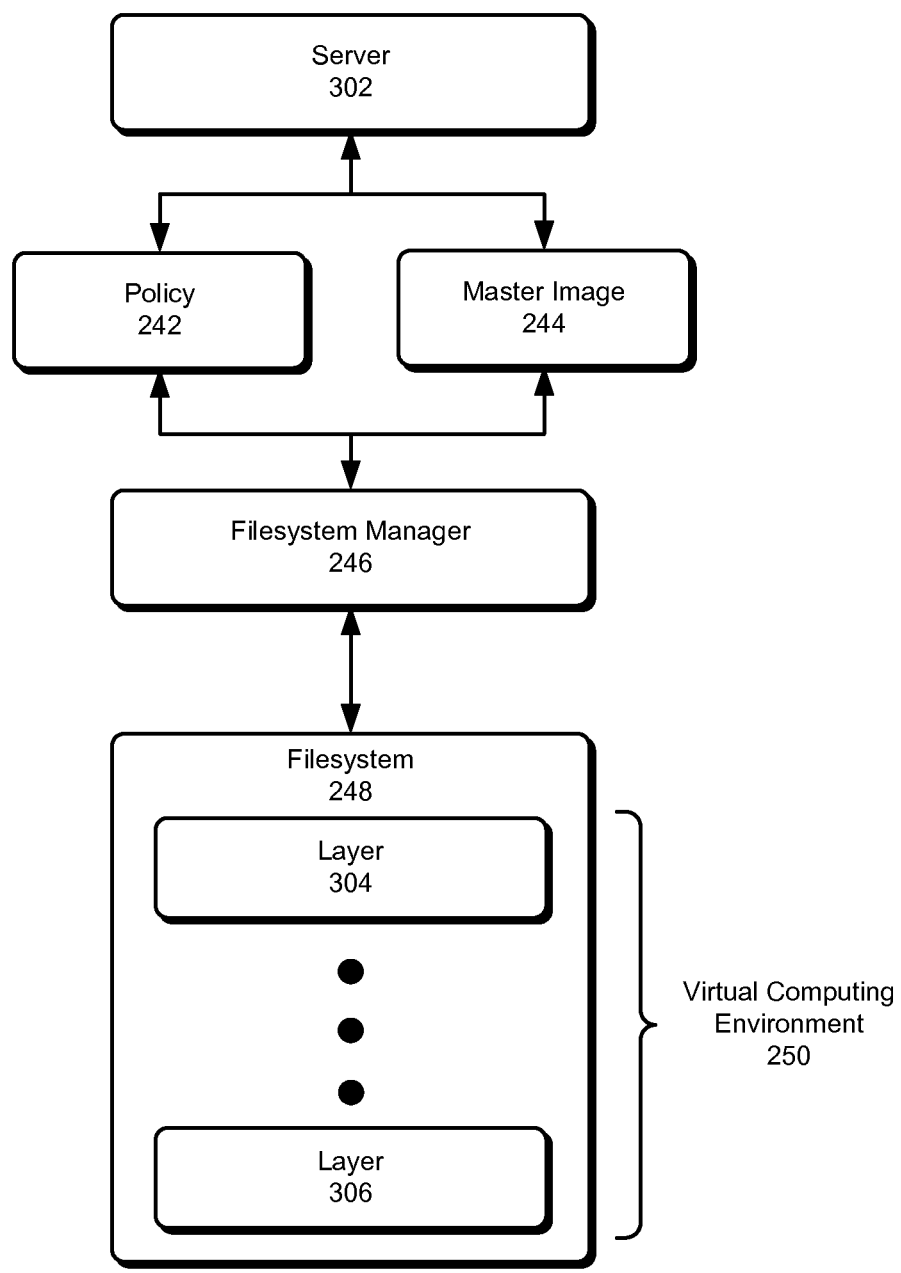
FIG. 3 shows a system for managing a filesystem in accordance with an embodiment.

FIG. 3 shows a system for managing filesystem 248 in accordance with an embodiment. As shown in FIG. 3, filesystem 248 includes a set of layers 304-306 that contain virtual computing environment 250. As mentioned previously, filesystem 248 may be created and managed by filesystem manager 246 using policy 242 and master image 244.

In particular, filesystem manager 246 may obtain policy 242 and master image 244 from a server 302, such as administration server 100 of FIG. 1. Filesystem manager 246 may use policy 242 to create layers 304-306 and populate one or more layers 304-306 with data from master image 244. In particular, master image 244 may correspond to an image of virtual computing environment 250 (e.g., operation system image). As a result, virtual computing environment 250 may be loaded from filesystem 248 once master image 244 is written to one or more layers 304-306. One or more layers 304-306 may also be created to store user-specific data associated with virtual computing environment 250, such as user-created documents, user-installed applications, and/or user-specific configuration settings.

In one or more embodiments, policy 242 and master image 244 are created and updated by an administrator of virtual computing environment 250 using a management interface with server 302. For example, the administrator may create virtual computing environment 250, install updates, apply patches, and/or otherwise configure virtual computing environment 250 through the management interface. The administrator may also upload a file containing policy 242 to server 302 using the management interface, or the administrator may generate policy 242 through the management interface. For example, the administrator may interact with a graphical user interface (GUI) or web-based user interface to add rules regarding layers, layer assignments, and/or other filesystem management parameters to policy 242.

The administrator may also manage access to policy 242 and master image 244 from multiple users through the management interface. As described above, each user may be associated with a subscription to virtual computing environment 250 and/or other virtual computing environments available on server 302. The administrator may add and remove subscriptions to different virtual computing environments based on the roles and needs of each user. Newly added subscriptions to virtual computing environment 250 may allow users associated with the subscriptions to obtain master image 244 from server 302. Similarly, users may no longer have access to master image 244 if subscriptions for the users are removed by the administrator.

As mentioned previously, policy 242 may be created by the administrator to facilitate the central management and user-specific configuration of virtual computing environment 250 within filesystem 248. In particular, the administrator may create policy 242 such that different layers 304-306 of filesystem 248 contain different types of data in virtual computing environment 250. Policy 242 may additionally specify that data for each layer 304 be obtained, updated, and/or restored from server 302, master image 244, and/or the user of virtual computing environment 250.

In one or more embodiments, policy 242 is linked to virtual computing environment 250 on server 302. For example, policy 242 may be created and/or provided by the administrator in conjunction with the creation of virtual computing environment 250 using the management interface. Policy 242 may additionally be bundled with master image 244 and/or included in updates to master image 244. When virtual computing environment 250 is loaded from filesystem 248, server 302 may be queried to determine if policy 242 has been updated. Updates to policy 242 may then be downloaded and used to reconfigure filesystem 248. This may allow administrators to update policy 242 without having to personally update each computer.

In one or more embodiments, filesystem 248 contains three layers 304-306 that are ordered based on a rank assigned to each layer: a highest-ranked user data layer, a mid-ranked application layer, and a lowest-ranked system layer. The system layer may contain data that is used to execute virtual computing environment 250. For example, the system layer may contain a guest operating system, as well as any applications, files, and registry keys bundled with the guest operating system by the administrator. As a result, the system layer may be populated with data from master image 244 and replaced every time a new master image 244 is obtained from server 302. Furthermore, the system layer may be protected from changes to virtual computing environment 250 by the user; instead, user changes may be stored in the user data layer or application layer. For example, user edits to a file stored in the system layer may be copied to a higher-ranked layer and stored in the higher-ranked layer.

The application layer may contain data for user-installed applications in virtual computing environment 250. For example, the application layer may include plugins, executables, and/or other software modules added to virtual computing environment 250 by the user, along with associated files (e.g., dynamic link libraries (DLLs)) and settings (e.g., registry keys). In other words, the application layer may be modified during execution of virtual computing environment 250, while the system layer may be modified independently of the user's execution of virtual computing environment 250. For example, the system layer may be updated with a new master image 244 while the user is running virtual computing environment 250. Once the user starts a new session with virtual computing environment 250 and/or reboots virtual computing environment 250, virtual computing environment 250 may be loaded from the new master image 244 in the system layer.

The user data layer may contain data corresponding to user-specific documents and settings in virtual computing environment 250. For example, the user data layer may include word processing documents, spreadsheets, Portable Document Format (PDF) files, media files (e.g., images, audio files, video files, etc.), user profile data, and/or other user identity data. As with the application layer, the user data layer may be modified by the user during execution of virtual computing environment 250. Because the user data layer essentially stores the user's identity in virtual computing environment 250, the user data layer may be periodically snapshotted and/or backed up (e.g., on server 302, on a host filesystem, etc.) by filesystem manager 246.

Consequently, crashes or errors in filesystem 248 or the computer system (e.g., computer system 200 of FIG. 2) on which filesystem 248 is stored may have little to no impact on the continued use of virtual computing environment 250 by the user. For example, a computer system crash may interrupt the user's access to virtual computing environment 250 on the affected computer system but does not preclude the user from running virtual computing environment 250 on other computer systems, particularly if the user data layer can be recovered from server 302.

I/O operations to filesystem 248 may be directed to the appropriate layer by filesystem manager 246 based on policy 242. In particular, a read operation may be processed by retrieving a file from the highest-ranked layer containing the file. For example, filesystem manager 246 may process a read operation by first searching the user data layer for a file requested in the read operation, then searching the application layer, and finally searching the system layer. By returning with files and/or data from higher-ranked (e.g., user-specific) layers, filesystem manager 246 may allow user changes to virtual computing environment 250 to take effect over master image 244.

A write operation may be processed by directing the write operation to a layer based on layer assignments in policy 242. For example, a write to a document may be directed to the user data layer, while a write to an executable file may be directed to the application layer. Writes may also be directed to the system layer if the writes are not meant to persist between invocations of virtual computing environment 250. For example, mail caches, web caches, and/or other temporary files and settings may be stored in the system layer and discarded every time virtual computing environment 250 is loaded.

If a directory listing in filesystem 248 is requested, the corresponding directory in each layer may be scanned for files. The result of all of the directory scans may then be merged and returned as the directory listing. Furthermore, if the directory scans return multiple versions of the same file, the version from a higher-ranked layer may take precedence over the version in a lower-ranked layer. For example, the user data layer and system layer may contain two different versions of the same file in the user's home directory. As a result, the file in the user data layer may be used in a directory listing of the home directory.

To handle file and directory deletions from read-only (e.g., system) layers, filesystem manager 246 may store a record of each deletion in a writable (e.g., user data, application) layer. For example, filesystem manager 246 may store deletions in a read-only layer as a hierarchy of Microsoft Windows registry sub-keys beginning with the root directory. If a sub-key exists for a deleted file, the file may not be shown in directory listings and may not be opened. The sub-key may further prevent lower-ranked layers from being searched for deleted files. Similarly, if a directory is deleted, sub-keys for sub-files and sub-directories of the directory are generated along with a sub-key for the directory. If the directory is subsequently recreated, the sub-key for the directory may be removed, while the sub-keys for the sub-files and sub-directories may be used to prevent deleted files from reappearing.

Furthermore, reads, writes, deletions, and/or enumerations of configuration data (e.g., Microsoft Windows registry keys and sub-keys) may be handled by filesystem manager 246 in a similar fashion to that of reads, writes, deletions, and/or directory listings of files. For example, each layer may contain a set of hive files for storing registry data for virtual computing environment 250. A read operation may be processed by retrieving the highest-ranked hive file containing the requested value. A write operation may be directed to a hive file in a layer based on the layer assignment associated with the write operation. Enumerations may be conducted by performing scans of corresponding keys from each layer and merging the results of the scans, with results from the highest-ranked layers taking precedence over results from lower-ranked layers. Finally, deletions to read-only layers may be stored in writable layers as sub-keys to prevent deleted values from being returned.

In one or more embodiments, layer assignments in policy 242 are specified using a data type, a data value, a filename, and/or a path. For example, files may be assigned to a layer using a full path matching (e.g., "\Program Files\Cisco\VPN Client\Profiles\Moka5.pcf"), a single directory matching (e.g., "\WINDOWS\System32\wbem\FS"), a recursive directory matching (e.g., "\Documents and Setting\"), and/or a leaf matching (e.g., "*.docx"). Configuration data such as registry keys and sub-keys may also be assigned to layers by specifying keys and/or key values in layer assignments. Furthermore, files and configuration data that do not match any predefined layer assignment in policy 242 may be directed to a default layer. For example, write operations that do not have a matching layer assignment may be directed to the application layer.

As mentioned previously, policy 242, master image 244, and/or filesystem manager 246 may be configured to facilitate the execution of virtual computing environment 250 in a number of ways. First, individual layers of filesystem 248 may be snapshotted, backed up, removed, temporarily disabled, and/or restored to increase reliability and integrity in virtual computing environment 250. For example, the application layer may be deleted from filesystem 248 if the user installs a virus on virtual computing environment 250. Afterwards, virtual computing environment 250 may continue to execute with the virus removed because the system layer and user data layer are still intact. Furthermore, the application layer may be restored from a snapshot and/or backup so that the user may have access to most, if not all, applications installed within the application layer. Layers may also be temporarily disabled within filesystem 248 to assist in troubleshooting of problems in virtual computing environment 250. For example, the application layer may be temporarily disabled to identify the source of an error, bug, and/or failure in virtual computing environment 250.

In addition, path-specific write protection may be provided by filesystem manager 246. For example, filesystem manager 246 may return an error if write operations attempt to write to a restricted path in filesystem 248. Alternatively, policy 242 may specify that writes to such paths be directed to the system layer and/or another temporary layer so that subsequent invocations of virtual computing environment 250 may effectively undo the writes.

To fine-tune the end-user configurability and/or central management of virtual computing environment 250, specific files and/or configuration data may be removed from a layer. For example, virus definition files for antivirus software on virtual computing environment 250 may normally be stored in the user data layer to allow the user to manage antivirus updates during execution of virtual computing environment 250. However, when a new master image 244 containing a comprehensive update of virus definition files is obtained from server 302, filesystem manager 246 may delete all virus definition files from the user data layer so that virus definition files from the new master image 244 in the system layer are used.

Furthermore, while filesystem 248 is described with respect to three layers (e.g., user data, application, system), filesystem 248 may be configured with an arbitrary number of layers. Each layer may be individually configured and managed by filesystem manager 246 to provide added versatility in executing and customizing virtual computing environment 250. An example of an alternative configuration of filesystem 248 is discussed below with respect to FIG. 4.

Filesystem 248 may also be interoperable with a portable storage device, such as portable storage device 160 of FIG. 1. As discussed above and in the above-referenced application, virtual computing environment 250 may be loaded from either a computer system (e.g., computer system 200 of FIG. 2) or the portable storage device. As a result, filesystem 248 may be used to store virtual computing environment 250 on either the computer system or portable storage device. Moreover, filesystem 248 may be distributed across the computer system and portable storage device. For example, the system layer may be stored on the computer system, while the user data layer and application layer may be stored on the portable storage device.

Figure 4:
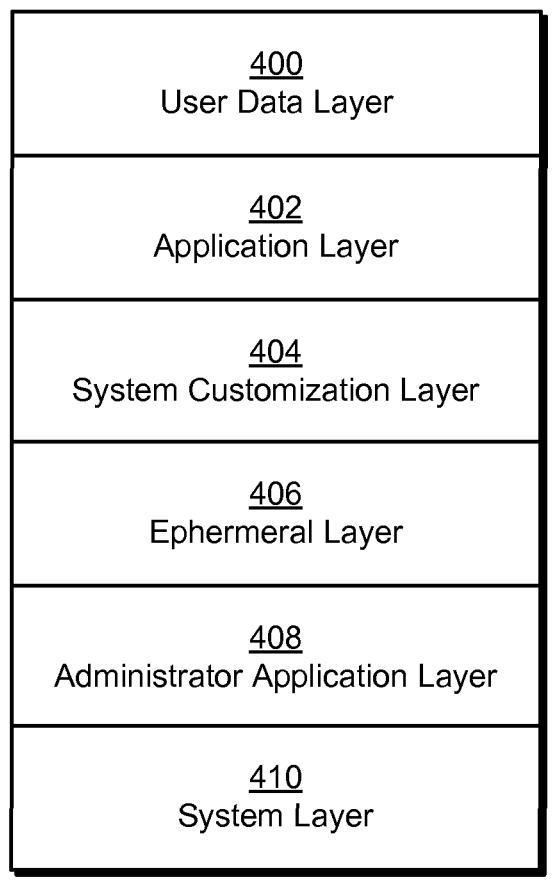
FIG. 4 shows an exemplary layered filesystem in accordance with an embodiment.

FIG. 4 shows an exemplary layered filesystem in accordance with an embodiment. The layered filesystem may be used to organize and update data associated with a virtual computing environment, such as virtual computing environment 250 of FIG. 2. As shown in FIG. 4, the layered filesystem includes a user data layer 400, an application layer 402, a system customization layer 404, an ephemeral layer 406, an administrator application layer 408, and a system layer 410. The layers may additionally be ranked from top to bottom. As a result, read operations to the layered filesystem may proceed from the highest-ranked user data layer 400 to the lowest-ranked system layer 410, while write operations to the layered filesystem may be directed to a specific layer based on attributes of the write operations.

As described above, user data layer 400 and application layer 402 may store user-specific changes to the virtual computing environment. As a result, user data layer 400 and application layer 402 may contain data obtained from a user of the virtual computing environment. Furthermore, data in user data layer 400 may be retained and/or backed up, while data in application layer 402 may be removed if a problem occurs in the virtual computing environment.

System layer 410 may contain an image of the virtual computing environment. The image may be obtained from a server (e.g., server 302 of FIG. 3) and replaced every time the virtual computing environment is loaded. Because system layer 410 may store the latest version of the virtual computing environment, updates, patches, and/or other administrative changes to the virtual computing environment may be automatically propagated from the server to the layered filesystem.

System customization layer 404 may store subscription and/or identity information associated with the virtual computing environment. In other words, the virtual computing environment and/or user may be identified using data in system customization layer 404. For example, system customization layer 404 may include machine secrets corresponding to the trust between a client workstation and an active directory server (e.g., active directory server 120 of FIG. 1). Furthermore, data in system customization layer 404 may be used to obtain a master image of the virtual computing environment, a policy (e.g., policy 242 of FIG. 2) for the layered filesystem, and/or other data associated with the virtual computing environment from the server. As a result, data in system customization layer 404 may persist for the lifetime of the virtual computing environment. Alternatively, subscription and identity information for the virtual computing environment may be stored in user data layer 400, which may also be kept as long as the subscription for the virtual computing environment exists.

Ephemeral layer 406 may store temporary data, such as mail caches, web caches, and/or other temporary files. The contents of ephemeral layer 406 may be discarded each time the virtual computing environment is invoked and/or updated. The behavior of ephemeral layer 406 may also be produced by directing temporary data to system layer 410, which is replaced with each invocation of the virtual computing environment.

In one or more embodiments, data in ephemeral layer 406 is stored on a computer system (e.g., computer system 200 of FIG. 2) when the virtual computing environment is loaded from a portable storage device (e.g., portable storage device 160 of FIG. 1). Such a configuration may provide both space savings and increased I/O performance on the portable storage device. Furthermore, because the contents of ephemeral layer 406 are discarded between uses of the virtual computing environment, ephemeral layer 406 may be regenerated as the virtual computing environment is loaded from the portable storage device onto different computers.

Administrator application layer 408 may be used to provide added configurability to the virtual computing environment. In particular, administrator application layer 408 may include subscription-specific applications in the virtual computing environment. For example, administrator application layer 408 may include software that is specific to the usage context of the virtual computing environment. Computational software and/or computer-aided design (CAD) software may be stored in administrator application layer 408 if the virtual computing environment is used by an engineer or scientist. On the other hand, administrator application layer 408 may include an image-editing program if the virtual computing environment is used by an artist or graphic designer.

As with the virtual computing environment, administrator application layer 408 may be created using a management interface with a server. To create administrator application layer 408, the administrator may load the virtual computing environment through the management interface and install one or more applications into a writable layer. Updates to administrator application layer 408 may also be made to the writable layer through the management interface. Once the administrator shuts down the virtual computing environment through the management interface, the writable layer may be packaged and provided on the server for inclusion in the layered filesystem and virtual computing environment. As a result, administrator application layer 408 may correspond to an image of one or more newly installed applications in the virtual computing environment.

The management interface may also allow the administrator to control access to the virtual computing environment. In other words, the management interface may be used by the administrator to include or omit administrator application layer 408 in the layered filesystem based on subscription information associated with the virtual computing environment. For example, administrator application layer 408 may only be included in the layered filesystem if subscription information in system customization layer 404 includes a subscription to administrator application layer 408.

Figure 5:
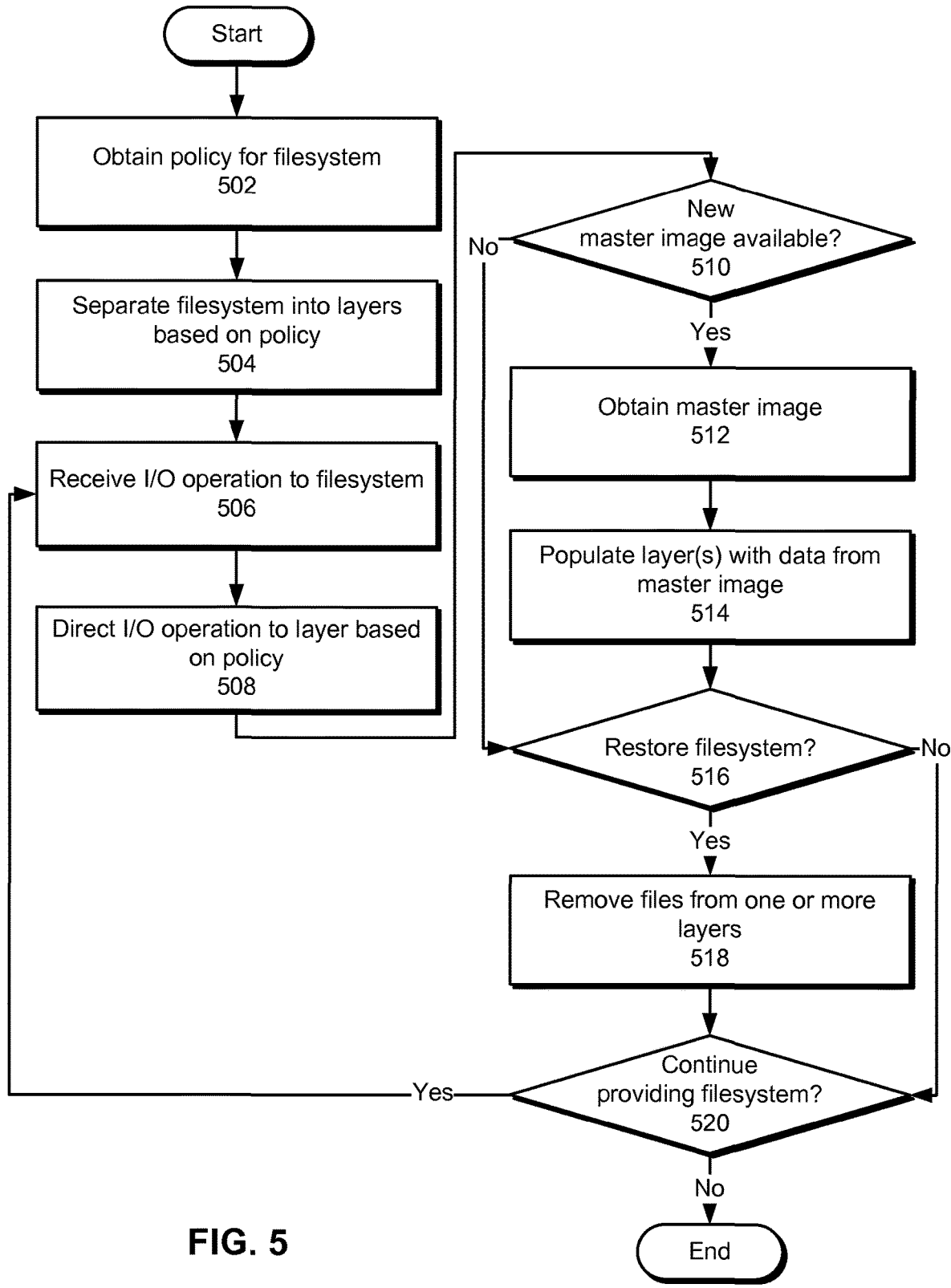
FIG. 5 shows a flowchart illustrating the process of providing a filesystem in a computer system in accordance with an embodiment.

FIG. 5 shows a flowchart illustrating the process of providing a filesystem in a computer system in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

First, a policy for the filesystem is obtained (operation 502). The policy may be created by an administrator and obtained from a server, such as server 302 of FIG. 3. Next, the filesystem is separated into layers based on the policy (operation 504). Separation of filesystems into layers is discussed below with respect to FIG. 6.

Once the filesystem is separated into layers, I/O operations to the filesystem may be processed. In particular, an I/O operation to the filesystem may be received (operation 506) and directed to a layer in the filesystem based on the policy (operation 508). For example, a read operation may return a requested file from the highest-ranked layer containing the file, while a write operation may be directed to a layer based on layer assignments specified by the policy.

The filesystem may also be maintained using a new master image (operation 510) of the filesystem. If a new master image is available (e.g., on the server), the master image is obtained (operation 512), and one or more layers are populated with data from the master image (operation 514). The filesystem may also be restored (operation 516). For example, the filesystem may be restored if a crash, bug, attack, and/or other error are caused by data within the filesystem, or if the filesystem is corrupted. If a restore is to be performed, files from one or more layers are removed (operation 518). For example, a layer may be removed if a virus is installed into the layer. Alternatively, files of a specific type, path, checksum, and/or other characteristic may be removed in a finer-grained restore operation. Restoring may also involve repopulating the layer with a snapshot or backup of data from the layer if available.

The filesystem may continue to be provided (operation 520). For example, the filesystem may contain a virtualized computing environment that executes on the computer system. Consequently, the filesystem may be provided for use by the virtual computing environment during execution of the virtual computing environment. If the filesystem continues to be provided, I/O operations to the filesystem are received (operation 506) and directed to a layer based on the policy (operation 508). The filesystem may also be periodically maintained using a master image of the filesystem (operations 510-514) and/or restored (operations 516-518). Operations 506-518 may continue until the filesystem is no longer provided.

Figure 6:
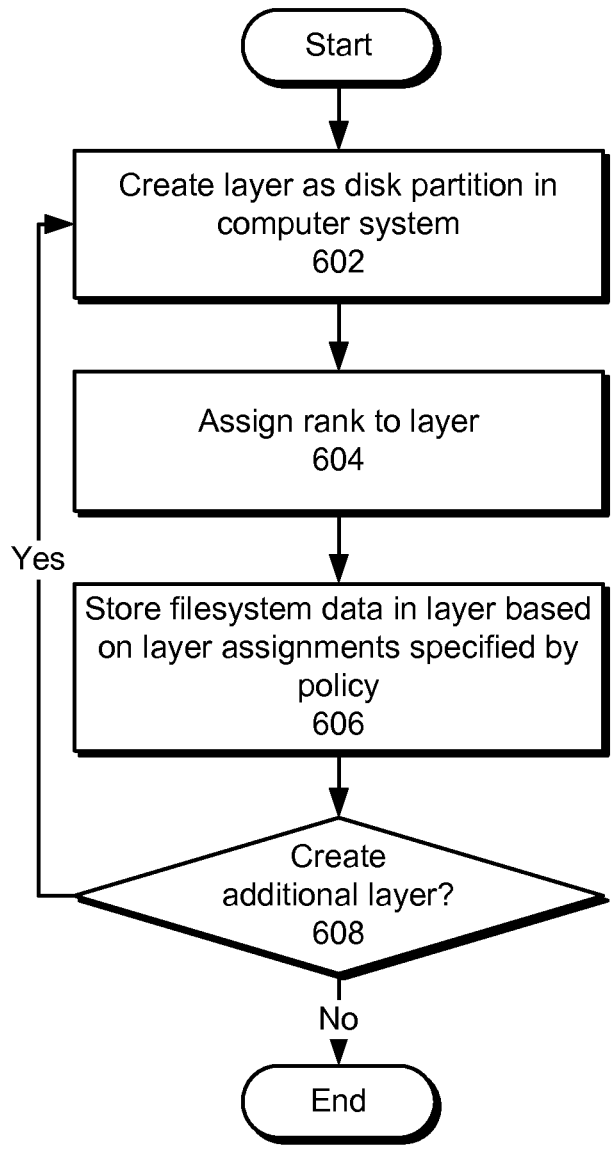
FIG. 6 shows a flowchart illustrating the process of separating a filesystem into a set of layers in accordance with an embodiment.

FIG. 6 shows a flowchart illustrating the process of separating a filesystem into a set of layers in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

First, a layer is created as a disk partition in a computer system (operation 602). Conversely, the layer may be created as a registry hive file if the layer is used to store registry data. Furthermore, the layer may be created from a directory on another filesystem (e.g., host filesystem, unlayered filesystem, network filesystem, etc.). Next, a rank is assigned to the layer (operation 604). The rank may be obtained from a policy for the filesystem. In addition, the rank may affect the processing of I/O operations to the layer, as well as other settings (e.g., updates, restores, deletions, etc.) associated with the layer. Filesystem data is then stored in the layer based on a set of layer assignments specified by the policy (operation 606). For example, the layer may store user documents and settings, installed applications, temporary data, and/or an image of a virtual computing environment.

Additional layers may also be created (operation 608) in the filesystem. If additional layers are to be created, each layer may be created as a disk partition, directory (e.g., from another filesystem), and/or registry hive file on the computer system (operation 602), a rank is assigned to the layer (operation 604), and filesystem data is stored in the layer based on layer assignments in the policy (operation 606). Separation of the filesystem into layers may continue until all layers specified in the policy have been created and configured to store data.

The description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for performing operations on a layered filesystem, comprising:
   receiving a policy for the layered filesystem, wherein system data critical to execution of a virtual computing environment is stored in at least one layer and user-specific data associated with user changes to the virtual computing environment is stored in at least one other layer; and
   receiving an input/output (I/O) operation involving a file, wherein at least two different versions of the file having different contents exist on two or more layers of the layered filesystem, wherein the at least two different versions of the file are associated with the same user;
   wherein the policy is used to maintain separation between the system data and user-specific data in the virtual computer environment.

2. The computer-implemented method of claim 1, wherein the policy comprises the set of layer assignments, and wherein said directing comprises determining a layer assignment that matches the I/O operation.

3. The computer-implemented method of claim 2, wherein said determining involves matching a path specified in the set of layer assignments with a path specified in the I/O operation.

4. The computer-implemented method of claim 2, wherein said determining involves matching a filename extension specified in the set of layer assignments with a filename extension specified in the I/O operation.

5. The computer-implemented method of claim 2, wherein said determining involves matching a registry key specified in the set of layer assignments with a registry key specified in the I/O operation.

6. The computer-implemented method of claim 2, wherein if no layer assignment matches the I/O operation, said directing comprises directing the I/O operation to a default layer.

7. A non-transitory computer-readable storage medium storing instructions that, when executed by a computer, cause the computer to perform a method for performing operations on a layered filesystem, the method comprising:
   receiving a policy for the layered filesystem, wherein system data critical to execution of a virtual computing environment is stored in at least one layer and user-specific data associated with user changes to the virtual computing environment is stored in at least one other layer; and
   receiving an input/output (I/O) operation involving a file, wherein at least two different versions of the file having different contents exist on two or more layers of the layered filesystem, wherein the at least two different versions of the file are associated with the same user;
   wherein the policy is used to maintain separation between the system data and the user-specific data in the virtual computer environment.

8. The non-transitory computer-readable storage medium of claim 7, wherein the policy comprises the set of layer assignments, and wherein said directing comprises determining a layer assignment that matches the I/O operation.

9. The non-transitory computer-readable storage medium of claim 8, wherein said determining involves matching a path specified in the set of layer assignments with a path specified in the I/O operation.

10. The non-transitory computer-readable storage medium of claim 8, wherein said determining involves matching a filename extension specified in the set of layer assignments with a filename extension specified in the I/O operation.

11. The non-transitory computer-readable storage medium of claim 8, wherein said determining involves matching a registry key specified in the set of layer assignments with a registry key specified in the I/O operation.

12. The non-transitory computer-readable storage medium of claim 8, wherein if no layer assignment matches the I/O operation, said directing comprises directing the I/O operation to a default layer.

13. A computer system, comprising:
   a processor; and
   a memory storing instructions that, when executed by the processor, cause the computer system to:
   receive a policy for the layered filesystem, wherein system data critical to execution of a virtual computing environment is stored in at least one layer and user-specific data associated with user changes to the virtual computing environment is stored in at least one other layer; and
   receive an input/output (I/O) operation involving a file, wherein at least two different versions of the file have different contents exist on two or more layers of the layered filesystem, wherein the at least two different versions of the file are associated with the same user;
   wherein the policy is used to maintain separation between the system data and the user-specific data in the virtual computer environment.

14. The computer system of claim 13, wherein the policy comprises the set of layer assignments, and wherein said computer system determines a layer assignment that matches the I/O operation.

15. The computer system of claim 14, wherein said determines involves a match of a path specified in the set of layer assignments with a path specified in the I/O operation.

16. The computer system of claim 14, wherein said determines involves a match of a filename extension specified in the set of layer assignments with a filename extension specified in the I/O operation.

17. The computer system of claim 14, wherein said determines involves a match of a registry key specified in the set of layer assignments with a registry key specified in the I/O operation.

18. The computer system of claim 14, wherein if no layer assignment matches the I/O operation, said computer system directs the I/O operation to a default layer.

19. A computer-implemented method for performing operations on a layered registry system, comprising:
   receiving a policy for the layered registry system, wherein the policy comprises a set of layer assignments, wherein system data critical to execution of a virtual computing environment is stored in at least one layer and user-specific data associated with user changes to the virtual computing environment is stored in at least one other layer;
   receiving an input/output (I/O) operation that specifies a registry key, wherein at least two different versions of the registry key having different contents exist on two or more layers of the layered registry system, wherein the at least two different versions of the registry key are associated with the same user; and
   determining a layer assignment that matches the I/O operation, wherein said determining involves matching a registry key specified in the set of layer assignments with the registry key specified in the I/O operation;
   wherein the policy is used to maintain separation between system data and the user-specific data in the virtual computer environment.

20. The computer-implemented method of claim 19 further comprising:
   generating another I/O operation based on the received I/O operation;
   directing the generated I/O operation to a layer in the layered filesystem, wherein the received I/O operation and the generated I/O operation are different; and
   temporarily disabling at least a layer in the layered filesystem, thereby facilitating management of the virtual computing environment, wherein each layer in the layered filesystem comprises at least a component of the virtual computing environment.

* * * * *